United States Patent
Chen et al.

(10) Patent No.: US 9,532,345 B2
(45) Date of Patent: *Dec. 27, 2016

(54) METHOD AND APPARATUS FOR PROCESSING UCI AND METHOD FOR TRANSMISSION THEREOF BASED ON MIMO SYSTEM

(71) Applicant: CHINA ACADEMY OF TELECOMMUNICATIONS TECHNOLOGY, Beijing (CN)

(72) Inventors: Wenhong Chen, Beijing (CN); Ya'nan Lin, Beijing (CN); Xuejuan Gao, Beijing (CN)

(73) Assignee: China Academy Of Telecommunications Technology, Beijing (CN)

(*) Notice: Subject to any disclaimer, the term of this patent is extended or adjusted under 35 U.S.C. 154(b) by 0 days.

This patent is subject to a terminal disclaimer.

(21) Appl. No.: 14/930,493

(22) Filed: Nov. 2, 2015

(65) Prior Publication Data

US 2016/0143024 A1 May 19, 2016

Related U.S. Application Data

(63) Continuation of application No. 13/703,628, filed as application No. PCT/CN2011/077911 on Aug. 2, 2011, now Pat. No. 9,210,696.

(30) Foreign Application Priority Data

Aug. 2, 2010 (CN) .......................... 2010 1 0243090

(51) Int. Cl.
H04W 72/04 (2009.01)
H04L 5/00 (2006.01)
(Continued)

(52) U.S. Cl.
CPC ........ *H04W 72/0413* (2013.01); *H04L 1/0073* (2013.01); *H04L 1/1858* (2013.01);
(Continued)

(58) Field of Classification Search
CPC ..... H04W 72/0413; H04L 1/1858; H04L 1/06; H04L 1/1671; H04L 2001/125
See application file for complete search history.

(56) References Cited

U.S. PATENT DOCUMENTS 8,284,687 B2* 10/2012 Hwang ................. H04L 1/0003
370/252
8,432,818 B2* 4/2013 Cai ....................... H04L 1/0027
370/252

(Continued)

FOREIGN PATENT DOCUMENTS

CN 1630380 A 6/2005
CN 1691544 A 11/2005
(Continued)

OTHER PUBLICATIONS

3GPP Organizational Partners. Evolved Universal Terrestrial Radio Access (E-UTRA); Multiplexing and channel coding. 3GPP TS 36.212 V8.3.0., pp. 20-23, (May 2008).
(Continued)

*Primary Examiner* — Rasheed Gidado
(74) *Attorney, Agent, or Firm* — Ladas & Parry LLP

(57) ABSTRACT

The present invention provides a method and apparatus for processing uplink control information (UCI) and a method for transmitting the UCI based on a multiple input multiple output system, which processing method comprises: repeating ACK/NACK source bits and/or rank indicator (RI) source bits in the uplink control information to form M groups, with each group corresponding to a code word (S302), wherein M is the total number of code words;
(Continued)

carrying out channel encoding on the ACK/NACK source bits and/or RI source bits of each code word to obtain $Q_{ACK}*L_i$ output bits (S304), wherein QACK is the channel encoding output bits corresponding to each layer in a certain code word, L is the total number of layers, and the layer number corresponding to the i-th code word is Li; and multiplexing and interleaving the output bits and the data bits of the corresponding code word (S306). The present invention solves the problems of transmission and channel encoding of the ACK/NACK and/or RI in the multiple input multiple output (MIMO) system, and at the same time takes into account high load situations and backward compatibility.

10 Claims, 3 Drawing Sheets

(51) Int. Cl.
*H04L 1/00* (2006.01)
*H04L 1/18* (2006.01)
*H04L 1/16* (2006.01)
*H04L 1/12* (2006.01)
*H04L 1/06* (2006.01)

(52) U.S. Cl.
CPC .......... *H04L 5/0026* (2013.01); *H04L 5/0055* (2013.01); *H04L 1/06* (2013.01); *H04L 1/1671* (2013.01); *H04L 2001/125* (2013.01)

(56) References Cited

U.S. PATENT DOCUMENTS

| | | | | |
|---|---|---|---|---|
| 8,515,440 B2* | 8/2013 | Damnjanovic | ........ | H04B 7/022 375/350 |
| 8,879,513 B2* | 11/2014 | Nam | ...................... | H04L 1/0031 370/335 |
| 9,055,572 B2* | 6/2015 | Aiba | ...................... | H04L 1/0041 |
| 2005/0213575 A1* | 9/2005 | Shin | ...................... | H04L 1/1628 370/389 |
| 2010/0103886 A1* | 4/2010 | Chun | ...................... | H04L 1/0028 370/329 |
| 2010/0239040 A1* | 9/2010 | Beluri | ................... | H04B 7/0417 375/267 |
| 2011/0103498 A1* | 5/2011 | Chen | ......................... | H04L 1/06 375/260 |
| 2011/0310853 A1* | 12/2011 | Yin | ....................... | H04L 1/0009 370/335 |
| 2013/0208670 A1 | 8/2013 | Chen et al. | | |

FOREIGN PATENT DOCUMENTS

| | | |
|---|---|---|
| CN | 101340442 A | 1/2009 |
| CN | 102118237 A | 7/2011 |

OTHER PUBLICATIONS

From PCT Application No. PCT/CN2011/077911, Chapter I International Preliminary Report on Patentability (IPRP) mailed on Feb. 5, 2013.
From PCT Application No. PCT/CN2011/077911, International Search Report (ISR) with English Translation mailed on Nov. 10, 2011.
From PCT Application No. PCT/CN2011/077911, Written Opinion (WO) with English Translation mailed on Nov. 10, 2011.
From U.S. Appl. No. 13/703,628 (Now Published as 2013/0208670), Non-Final Rejection mailed on Jun. 30, 2014.
From U.S. Appl. No. 13/703,628 (Now Published as 2013/0208670), Final Rejection mailed on Jan. 27, 2015.
From U.S. Appl. No. 13/703,628 (Now Published as 2013/0208670), Notice of Allowance mailed on Aug. 4, 2015.

\* cited by examiner

METHOD AND APPARATUS FOR PROCESSING UCI AND METHOD FOR TRANSMISSION THEREOF BASED ON MIMO SYSTEM

FIELD OF THE PRESENT INVENTION

The embodiments of the present invention relates to the field of communication technology, in particular to a method and apparatus for processing uplink control information (UCI) and a method for transmitting the UCI based on a multiple input multiple output system.

BACKGROUND OF THE PRESENT INVENTION

In an LTE-A system, the transmission of uplink control information (UCI) in a PUSCH (Physical Uplink Shared Channel) should take multi-carrier transmission and MIMO (Multiple Input Multiple Output) transmission into consideration. To obtain the most diversity gains, it is necessary to repeatedly transmit ACK and RI on all transmission layers and take high load caused by multi-carrier into account at the same time. Single-code word and single-layer transmission is only supported in current standards and ACK/NACK and/or RI are transmitted in a small amount. How to repeatedly transmit ACK/NACK and/or RI (Rank Indicator) on multi-code word and multi-layer and code channels should be further clarified.

Uplink control information including ACK/NACK feedback information, periodical/non-periodical channel state information (CSI) (including CQI (Channel Quality Indicator) information/PMI (Precoding Matrix Indicator) and RI information). In an LTE R8 system, UCI can be transmitted on a PUCCH (Physical Uplink Control Channel) or transmitted multiplexing with the data on a PUSCH.

Non-periodical reporting of CQI/PMI/RI information is transmitted on a PUSCH. For the condition that the number of CQI/PMI/RI feedback bits is no more than 11, a RM (32, O) block code is adopted for coding the transmitting data during channel coding firstly and then corresponding transmission resource sizes of CQI/PMI/RI are switched over through repetition/truncation coding, wherein, O refers to the number of bits of the original input information, and the RM (32, O) block code in an LTE Rel-8 system can support 11-bit original input information at most; for the condition that the number of CQI/PMI/RI feedback bits is greater than 11, a tail-biting convolutional code is adopted for coding channels. While periodical reporting of CQI/PMI/RI information is transmitted on PUCCH format 2/2a/2b channels in accordance with the preconfigured reporting cycle, and a RM (20, A) block code is adopted for coding channels of the transmission data, wherein, A means the number of bits of the original input information, and the RM (20, A) block code in an LTE Rel-8 system can support 13-bit original input information at most.

ACK/NACK feedback information can be transmitted on a PUCCH or PUSCH according to specific dispatching. 4-bit ACK/NACK information is supported at most in a Rel-8 system. When ACK/NACK information is transmitted in PUCCH format1/1a/1b, channel coding will not be performed; when ACK/NACK information is transmitted multiplexing with the data on the PUSCH, 1-bit or 2-bit ACK/NACK information is coded repeatedly as a channel code. The channel code of more than 2-bit ACK/NACK information, is as same as the channel code of non-periodic CQI/PMI/RI transmission, combining a RM (32, O) block code and repetition/truncation code.

To be compatible with an LTE system, an LTE-A system supports the transmission of UCI on a PUCCH and/or PUSCH. LTE-A can support 5 carriers at most to aggregate at present, that is to say, in the same uplink subframe, UE should feed back multi-bit UCI corresponding to a plurality of downlink subframes. Taking ACK/NACK feedback information as an example, it is necessary for a FDD system to feed back 10-bit ACK/NACK information at most and for a TDD system to feed back 40-bit ACK/NACK information at most. To support the transmission on a PUSCH with more information bits, the current LTE channel coding mode should be extended. In the LTE system, when selecting a channel coding mode of CQI, it has verified that the RM (Reed-Muller) block code has more better performance, the coding and decoding are simple, and it is unnecessary to define a code word set separately for the input information with different lengths. Compared with a RM code, a convolutional code has a poor performance, especially when the original information with a short length is input. However, for the LTE-A system, when a receiving terminal adopts maximum likelihood (ML) for coding, exponential growth will exist between the decoding complexity of a RM code and the length of coding original information. For a convolutional code, Viterbi decoding algorithm is used as the optimal ML decoding algorithm, and linear growth will exist between decoding complexity and the length of coding original information. Therefore, in the LTE-A, UCI should select a channel coding mode with moderate performance and decoding complexity in accordance with the size of information bits.

On the other hand, it is necessary to support four-layer spatial multiplexing transmission of two code words at most in LTE-A. How to transmit UCI on a plurality of layers should also be resolved. As shown in the conclusion of the meeting at present, CQI is multiplexed in a code word, while ACK/NACK and/or RI are transmitted repeatedly on all code words to obtain diversity gains. For ACK/NACK and/or RI transmission, the number of symbols occupied on each layer is calculated as per the following formula and current standards are expanded to a certain degree:

$$Q' = \min\left\{ \left\lceil \frac{O \cdot M_{sc}^{PUSCH-initial} \cdot N_{symb}^{PUSCH-initial} \cdot \beta_{offset}^{PUSCH}}{\sum_{r=0}^{C^{(0)}-1} K_r^{(0)} + \sum_{r=0}^{C^{(1)}-1} K_r^{(1)}} \right\rceil, 4 \cdot M_{sc}^{PUSCH} \right\}$$

Thus channel coding output bit of ACK/NACK and/or RI, $Q_{ACK}$ is equal to $Q'^* Q_m$. How to determine $\beta_{offset}^{PUSCH}$ is unconcluded. The same value can be used for all code words or different values are adopted for different code words or even for different layers, at this time the number of UCI symbols obtained of each code word/layer will be different. Different data modulation methods may be used for each code word/layer, thus how to repeat information bits and conduct channel coding and modulation on different code words should be standardized.

Two technologies can support multi-code word and multi-layer UCI transmission at present.

FIG. 1 is a schematic diagram of UCI transmission of independent coding of each code word. As shown in Scheme I of FIG. 1, channel coding for UCI of each code word is performed independently, and then channel interleaving, scrambling and modulation are conducted for UCI and data.

During channel coding, the code word is repeated according to the mapped layers and modulation methods, so as to ensure that the information transmitted on a plurality of the mapped layers is the same.

FIG. 2 is a schematic diagram of UCI transmission of independent coding of each layer. As shown in Scheme II of FIG. 2, firstly layer mapping is performed for the data and CQI to obtain data bits of each layer and UCI is processed on each layer independently (the process is the same as the one conducted in accordance with current standards), then UCI and the data are merged. Different number of information bits or information symbol can be used on each layer.

As for Scheme I, repetition in a code word is conducted after channel coding and a modulation method is required, thus coding is complicated; as for Scheme II, channel coding, interleaving, scrambling, modulation and other processes are performed on each layer independently, thus processing complexity is increased (it is only necessary for a code word to undergo this process as shown in Scheme I). The disadvantage of the two schemes means that no high information bit load (for example, information source of greater than 11 bits) is supported for the reused R8 coding mode.

SUMMARY OF THE INVENTION

For one or a plurality of problems in relevant technologies, the present invention aims to provide a method and an apparatus for processing uplink control information (UCI) and a method for transmitting the UCI based on a multiple input multiple output system, so as to at least resolve one of the above problems.

A method for processing uplink control information (UCI) based on a multiple input multiple output system is provided according to the embodiments of the present invention, which comprises: repeat an ACK/NACK source bit and/or RI source bit in the uplink control information to M groups, each group corresponds to a code word, wherein, M refers to total code words; perform channel coding for the ACK/NACK source bit and/or RI source bit of each code word to obtain $Q_{ACK}*L_i$ output bits, wherein, $Q_{ACK}$ represents an output bit of channel coding corresponding to each layer of a certain code word, L represents total layers, $L_i$ represents layer number corresponding to the $i^{th}$ code word; and multiplex and interleave data bits of the output bits and corresponding code words.

A method for transmitting UCI adopting the method for processing the UCI is provided according to the embodiments of the present invention.

The method for processing UCI based on a MIMO system is provided according to the embodiments of the present invention.

The method comprises: repeating ACK/NACK source bits and/or rank indicator (RI) source bits to form L groups, with each group corresponding to a layer, wherein L is the total number of code words; carrying out channel coding on the ACK/NACK source bits and/or RI source bits of each layer to obtain $Q_{ACK}$ output bits; and multiplexing and interleaving the output bits and the data bits of the corresponding layer.

The method for transmitting UCI adopting the method for processing uplink control information is provided according to the embodiments of the present invention.

An apparatus for processing UCI based on a MIMO system is provided according to the embodiments of the present invention.

The apparatus comprises: a repetition module, for repeating ACK/NACK source bits and/or RI source bits in the uplink control information to M groups, with each group corresponding to a code word, wherein, M is the total number of code words and is a positive integer; a channel coding module, for performing channel coding on the ACK/NACK source bits and/or RI source bits of each code word to obtain $Q_{ACK}*L_i$ output bits, wherein $Q_{ACK}$ is the channel coding output bits corresponding to each layer in a certain code word, L is the total number of layers, and the layer number corresponding to the $i^{th}$ code word is $L_i$; and a processing module, for multiplexing and interleave the output bits and the data bits of the corresponding code word.

The apparatus for processing UCI based on a MIMO system is provided according to the embodiments of the present invention.

The apparatus comprises: a repetition module, for repeating ACK/NACK source bits and/or RI source bits in the uplink control information to L groups with each group corresponding to a layer, wherein, L is the total number of layers; a channel coding module, for performing channel coding on the ACK/NACK source bits and/or RI source bits of each layer to obtain $Q_{ACK}$ output bits; and a processing module, for multiplexing and interleave the output bits and the data bits of the corresponding layer.

The present invention provides a method for transmitting UCI in a PUSCH, which solves the problems of transmission and channel coding of the ACK/NACK and/or RI in the multiple input multiple output (MIMO) system, and at the same time takes into account high load situations and backward compatibility.

BRIEF DESCRIPTION OF THE DRAWINGS

A schematic diagram of UCI of independent coding of each code word is shown in FIG. 1; A schematic diagram of UCI of independent coding of each layer is shown in FIG. 2;

A method for processing uplink control information (UCI) based on a multiple input multiple output system according to the embodiments of the present invention is shown in FIG. 3;

Figure 4:
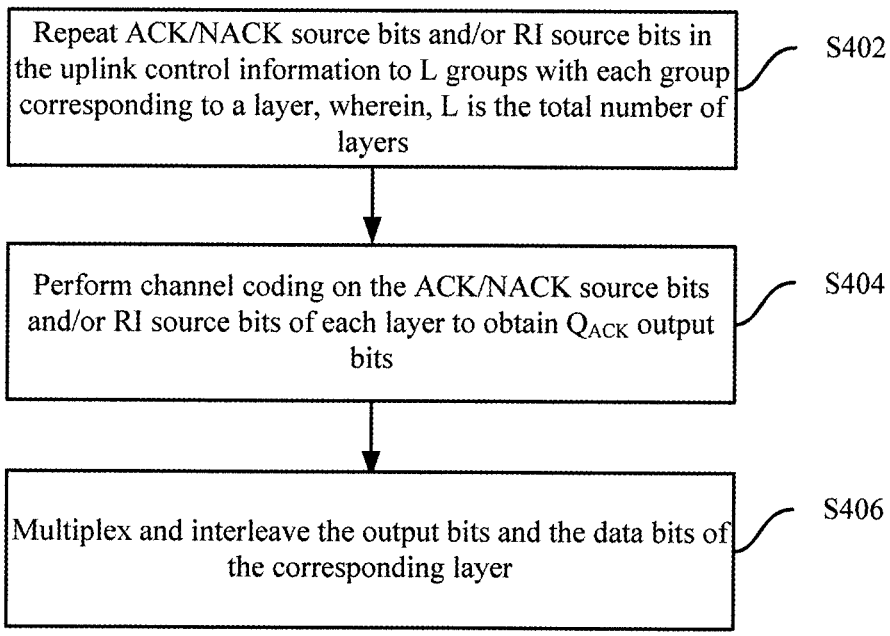
Figure 5:
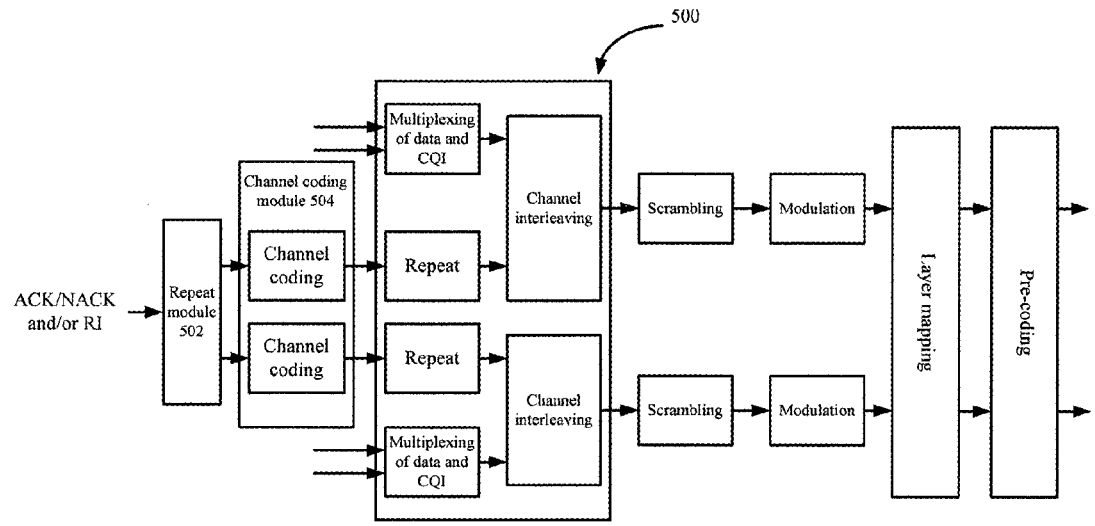
Figure 6:
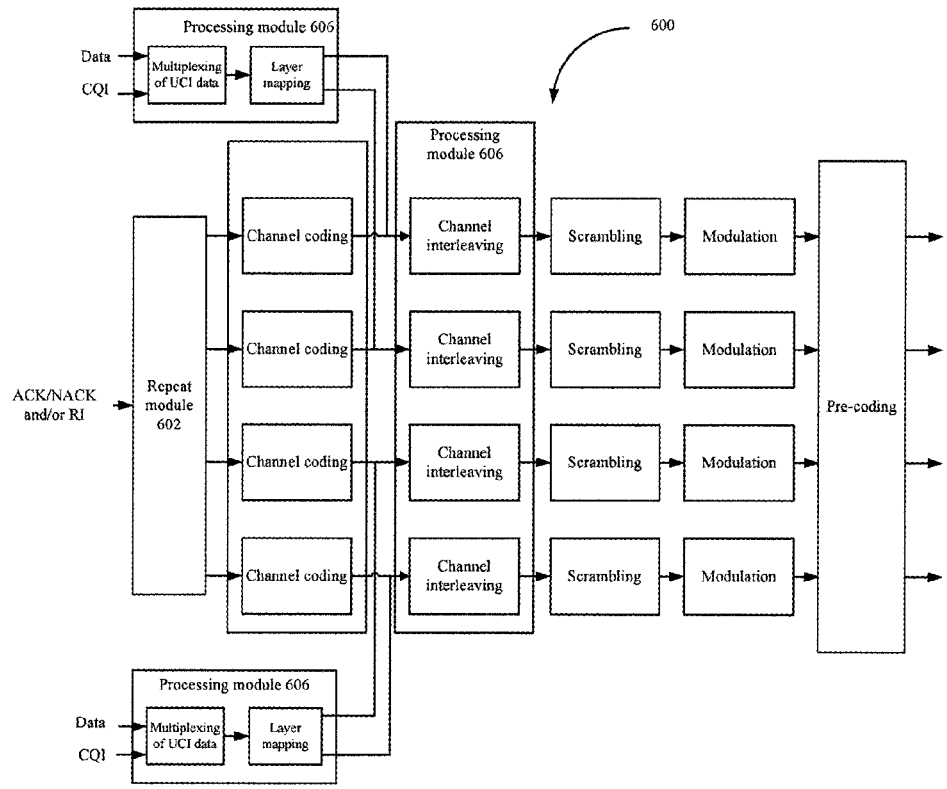

A method for processing uplink control information (UCI) based on a multiple input multiple output system according to the embodiments of the present invention is shown in FIG. 4;

An apparatus for processing uplink control information (UCI) based on a multiple input multiple output system according to the embodiments of the present invention is shown in FIG. 5; and An apparatus for processing UCI based on a MIMO system according to the embodiments of the present invention is shown in FIG. 6.

DETAILED DESCRIPTION OF THE EMBODIMENTS OF THE PRESENT INVENTION

Figure 1:
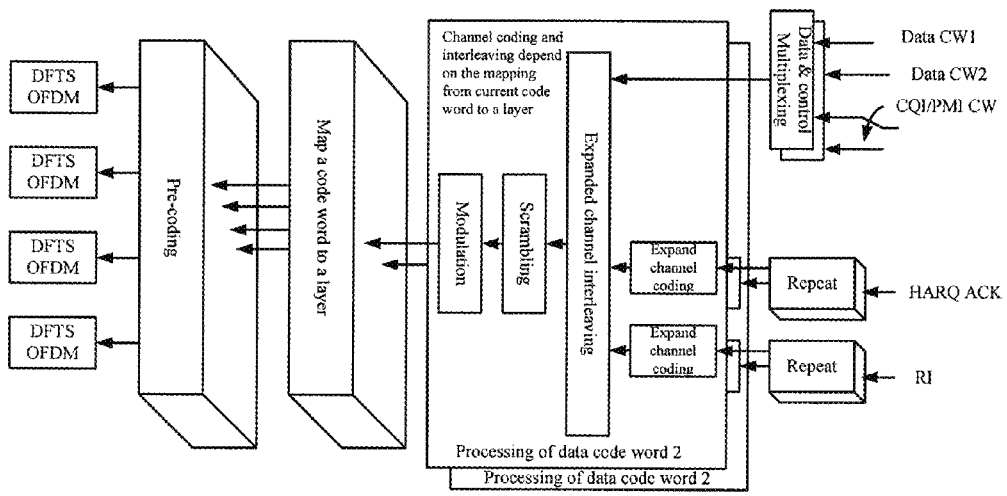
Figure 2:
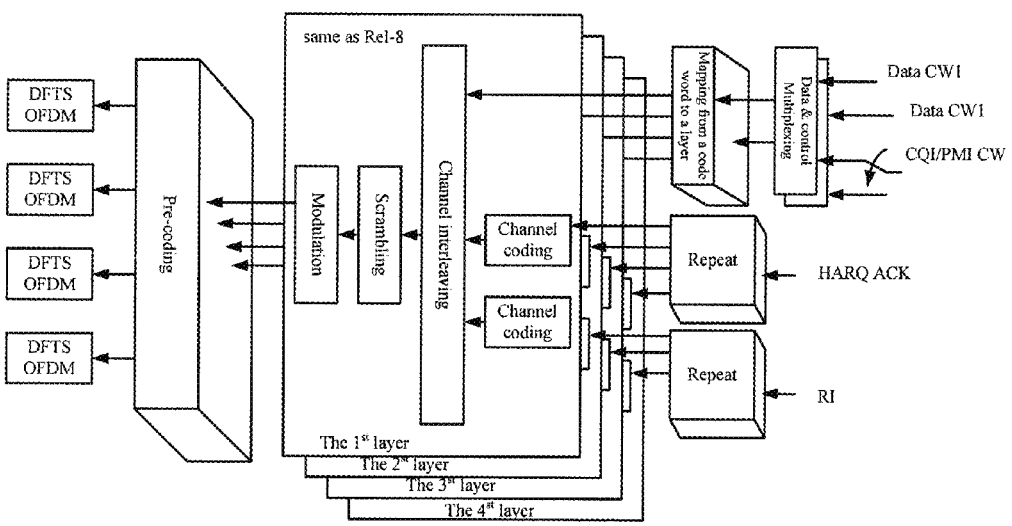
Figure 3:
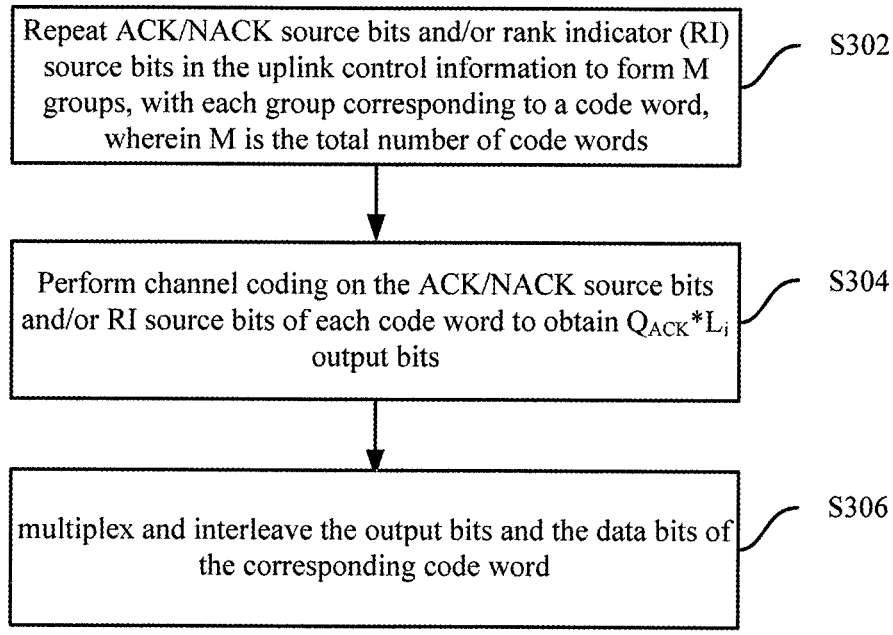

The method for processing UCI based on a MIMO system according to the embodiments of the present invention is shown in FIG. 3, which comprises:

Step S302: Repeat ACK/NACK source bits and/or rank indicator (RI) source bits in the uplink control information to form M groups, with each group corresponding to a code word, wherein M is the total number of code words;

Step S304: Perform channel coding on the ACK/NACK source bits and/or RI source bits of each code word to obtain $Q_{ACK}*L_i$ output bits, wherein $Q_{ACK}$ is the channel coding output bits corresponding to each layer in a certain code word, L is the total number of layers, and the layer number corresponding to the $i^{th}$ code word is $L_i$; and Step S306: multiplex and interleave the output bits and the data bits of the corresponding code word.

Wherein, coding modes are determined in accordance with the number of ACK/NACK source bits and/or RI source bits corresponding to each code word and such source bits are coded with the determined coding modes.

If the number of the ACK/NACK source bits and/or RI source bits is smaller than A, such source bits are coded repeatedly after a placeholder is inserted to obtain $Q_{ACK}$ output bits; if the number of the ACK/NACK source bits and/or RI source bits is greater than or equal to A and smaller than or equal to B, a RM (32, O) codeword is adopted for coding channels. If $Q_{ACK}>32$, cycle and repeat the coded bits to obtain $Q_{ACK}$ output bits; and if the number of the ACK/NACK source bits and/or RI source bits is greater than B, a convolutional code is adopted for coding channels to obtain $Q_{ACK}$ output bits, wherein, A<B and A and B are positive integers.

Repeat output bits according to the number of the mapped layers of current code word, $L_i$ to obtain output bits corresponding to all layers in the code word.

If data modulation mode in current code word is $Q_m$, repeat the output bits by taking $Q_m$ bits as the unit; or repeat $Q_{ACK}$ output bits without reference to data modulation mode in the code word.

If the number of the ACK/NACK source bits and/or RI source bits is smaller than A, source bits are coded repeatedly after a placeholder is inserted to obtain $Q_{ACK}*L_i$ output bits; if the number of the ACK/NACK source bits and/or RI source bits is greater than or equal to A and smaller than or equal to B, a RM (32, O) codeword is adopted for coding channels. If $Q_{ACK}*L_i>32$, cycle and repeat the coded bits to obtain $Q_{ACK}*L_i$ output bits; and if the number of the ACK/NACK source bits and/or RI source bits is greater than B, a convolutional code is adopted for coding channels to obtain $Q_{ACK}*L_i$ output bits, wherein, A<B and A and B are positive integers.

Specifically, A=3, B=10 or 11.

The embodiments of the present invention also provide a method for transmitting uplink control information (UCI) adopting the method for processing the UCI.

A method for processing uplink control information (UCI) based on a multiple input multiple output system according to the embodiments of the present invention is shown in FIG. 4, which comprises:

Step 402: Repeat ACK/NACK source bits and/or RI source bits in the uplink control information to L groups with each group corresponding to a layer, wherein, L is the total number of layers;

Step 404: Perform channel coding on the ACK/NACK source bits and/or RI source bits of each layer to obtain $Q_{ACK}$ output bits; and Step 406: Multiplex and interleave the output bits and the data bits of the corresponding layer.

Determine coding modes in accordance with the number of ACK/NACK source bits and/or RI source bits corresponding to each code word, and code such source bits with the determined coding modes.

If the number of the ACK/NACK source bits and/or RI source bits is smaller than A, such source bits are coded repeatedly after a placeholder is inserted to obtain $Q_{ACK}$ output bits; if the number of the ACK/NACK source bits and/or RI source bits is greater than or equal to A and smaller than or equal to B, a RM (32, O) code is adopted for coding channels. If $Q_{ACK}>32$, cycle and repeat the coded bits to obtain $Q_{ACK}$ output bits; and if the number of the ACK/NACK source bits and/or RI source bits is greater than B, a convolutional code is adopted for coding channels to obtain $Q_{ACK}$ output bits. Therein, A<B, A and B are positive integers.

Specifically, A=3, B=10 or 11.

The embodiments of the present invention also provide a method for transmitting uplink control information (UCI) adopting the method for processing the UCI.

An apparatus for processing uplink control information (UCI) based on a multiple input multiple output system according to the embodiments of the present invention is shown in FIG. 5. Two-codeword transmission is only shown and for explanation, however, the present invention includes but not limited to the two code words. If there is only one codeword, there will be only one signal. The dotted-line box in FIG. 5 represents possible processes.

The apparatus 500 comprises: the repetition module 502, for repeating ACK/NACK source bits and/or RI source bits in the uplink control information to M groups with each group corresponding to a code word, wherein, M is the total number of code words and is a positive integer; the channel coding module 504, for performing channel coding on the ACK/NACK source bits and/or RI source bits of each code word to obtain $Q_{ACK}*L_i$ output bits, wherein $Q_{ACK}$ is the channel coding output bits corresponding to each layer in a certain code word, L is the total number of layers, and the layer number corresponding to the $i^{th}$ code word is Li; and the processing module 506, for multiplexing and interleave the output bits and the data bits of the corresponding code word.

The channel coding module 504 comprises: a module for determining coding modes, for determining coding modes according to the number of ACK/NACK source bits and/or RI source bits corresponding to each code word; and a coding module, for coding ACK/NACK source bits and/or RI source bits with the determined methods.

If the number of the ACK/NACK source bits and/or RI source bits is smaller than A, such source bits are coded repeatedly after a placeholder is inserted to obtain $Q_{ACK}$ output bits; if the number of the ACK/NACK source bits and/or RI source bits is greater than or equal to A and smaller than or equal to B, a RM (32, O) code is adopted for coding channels. If $Q_{ACK}>32$, cycle and repeat the coded bits to obtain $Q_{ACK}$ output bits; and if the number of the ACK/NACK source bits and/or RI source bits is greater than B, a convolutional code is adopted for coding channels to obtain $Q_{ACK}$ output bits; wherein, A<B and A and B are positive integers.

Repeat output bits in accordance with the number of the mapped number of current code word, $L_i$ to obtain output bits corresponding to all layers in the code word.

If data modulation mode in current code word is $Q_m$, the channel coding module repeats the output bits by taking $Q_m$ bits as the unit; or repeats $Q_{ACK}$ output bits directly without reference to data modulation mode in a code word.

If the number of the ACK/NACK source bits and/or RI source bits is smaller than A, such source bits are coded repeatedly after a placeholder is inserted to obtain $Q_{ACK}*L_i$ output bits; if the number of the ACK/NACK source bits and/or RI source bits is greater than or equal to A and smaller than or equal to B, a RM (32, O) code is adopted for coding channels. If $Q_{ACK}*L_i>32$, cycle and repeat the coded bits to obtain $Q_{ACK}*L_i$ output bits; and if the number of the ACK/NACK source bits and/or RI source bits is greater than B, a convolutional code is adopted for coding channels to obtain $Q_{ACK}*L_i$ output bits, wherein, A<B and A and B are positive integers.

Specifically, A=3, B=10 or 11.

An apparatus for processing UCI based on a MIMO system according to the embodiments of the present invention is shown in FIG. 6.

Four-layer transmission is only shown in FIG. 6. If L<4, there is only L signals. However, this is only schematic and can be used to transmit for other different layers.

The apparatus 600 comprises: the repetition module 602, for repeating ACK/NACK source bits and/or RI source bits in the uplink control information to L groups with each group corresponding to a layer, wherein, L is the total number of layers; the channel coding module 604, for performing channel coding on the ACK/NACK source bits and/or RI source bits of each layer to obtain $Q_{ACK}$ output bits; and the processing module 606, for multiplexing and interleave the output bits and the data bits of the corresponding layer.

The channel coding module 604 comprises: a module for determining coding modes, for determining coding modes according to the number of ACK/NACK source bits and/or RI source bits corresponding to each code word; and a coding module, for coding ACK/NACK source bits and/or RI source bits with the determined methods.

If the number of the ACK/NACK source bits and/or RI source bits is smaller than A, the channel coding module repeatedly codes such source bits after a placeholder is inserted to obtain $Q_{ACK}$ output bits; if the number of the ACK/NACK source bits and/or RI source bits is greater than or equal to A and smaller than or equal to B, the channel coding module adopts a RM (32, O) code to code channels. If $Q_{ACK}>32$, cycle and repeat the coded bits to obtain $Q_{ACK}$ output bits; and if the number of the ACK/NACK source bits and/or RI source bits is greater than B, a convolutional code is adopted for coding channels to obtain $Q_{ACK}$ output bits, wherein, A<B and A and B are positive integers.

Specifically, A=3, B=10 or 11.

Specifically, the method for processing and transmitting UCI can be used for a MIMO+CA system of an LTE-A. Suppose that the number of ACK/NACK source bits and/or RI source bits is O, the channel coding output bit corresponding to each layer in a certain code word is $Q_{ACK}$ ($Q_{ACK}$ of each code word may be different), the total number of code words of PUSCH is M, the total number of layers is L, and the layer number corresponding to the $i^{th}$ code word is $L_i$.

Scheme 1: Process Each Code Word Independently

1. Repeat ACK/NACK source bits and/or RI source bits to form M groups with each group corresponding to a code word;
2. Perform channel coding on the ACK/NACK source bits and/or RI source bits of each code word to obtain $Q_{ACK}*L_i$ output bits, which can be realized with two methods:

Method 1: Obtain $Q_{ACK}$ output bits with the following methods;
1) If the number of source bits is smaller than A, code again after inserting a placeholder for source bits (R8 coding mode available).
2) If the number of the ACK/NACK source bits and/or RI source bits is greater than or equal to A and smaller than or equal to B, a RM (32, O) code is adopted for coding channels. If $Q_{ACK}>32$, cycle and repeat the coded bits to obtain $Q_{ACK}$ output bits (R8 coding mode available).
3) If the number of source bits is greater than B, grouping the source bits, and RM (32, O) code is adapted to code channels for each group of the source bits, and then, output $Q_{ACK}$ bits.

Wherein, A<B and typical values are A=3 and B=10 or 11;

Secondly, repeat output bits in accordance with the number of the mapped layers $L_i$ of current code word to obtain output bits of all layers in the code word. Repetition can be realized with two methods (if only one layer is mapped, it is unnecessary to repeat);

Method a: If data modulation mode in current code word is $Q_m$, repeat output bits by taking $Q_m$ bits as the unit;

Method b: Repeat $Q_{ACK}$ output bits without reference to data modulation mode in a code word.

Method 2: Obtain $Q_{ACK}*L_i$ output bits with the following methods.
1) If the number of source bits is smaller than A, such source bits are coded repeatedly after a placeholder is inserted to obtain $Q_{ACK}*L_i$ output bits.
2) If the number of source bits is greater than or equal to A and smaller than or equal to B, adopt a RM (32, O) code is adopted to code channels; if $Q_{ACK}*L_i>32$, cycle and repeat the encoded bits to obtain $Q_{ACK}*L_i$ output bits;
3) If the number of source bits is greater than B, grouping the source bits, and RM (32, O) code is adapted to code channels for each group of the source bits, and then, output $Q_{ACK}*L_i$ bits;

Wherein, A<B and typical values are A=3 and B=10 or 11;

3. Multiplex and interleave the output bits and the data bits of the corresponding code.

Scheme 2: Process Each Layer Independently

1. Repeat ACK/NACK source bits and/or RI source bits to form L groups with each group corresponding to a layer;
2. Perform channel coding on the ACK/NACK source bits and/or RI source bits of each layer to obtain $Q_{ACK}$ output bits ($Q_{ACK}$ of each layer may be different);
1) If the number of source bits is smaller than A, code again after inserting a placeholder for resource bits (R8 coding mode available).
2) If the number of source bits is greater than or equal to A and smaller than or equal to B, adopt a RM (32, O) code to code channels; if $Q_{ACK}>32$, cycle and repeat the coded bits to obtain $Q_{ACK}$ output bits (R8 coding mode available).
3) If the number of source bits is greater than B, grouping the source bits, and RM (32, O) code is adapted to code channels for each group of the source bits, and then, output $Q_{ACK}$ bits.

Wherein, A<B and typical values are A=3 and B=10 or 11;

3. Multiplex and interleave the output bits and the data bits of the corresponding layer.

Embodiment I (Corresponding to Scheme I and Method 1)

Supposing that there are O=10 bits of ACK/NACK source bits and/or RI source bits $o_n^{ACK}$, 3-layer PUSCH data transmission of M=2 code words in total (one layer for the first code word and two layers for the second code word), the sequence of coded output bits is $q_i^{ACK}$ (the length of output bits on each layer of two code words, $Q_{ACK}$ is 40 and 30 respectively), the processing steps are as follows:

1. Copy source bits to form two groups, with each group referring to $o_n^{ACK}$, used for ACK/NACK transmission and/or RI transmission on two code words respectively.

2. Perform channel coding on each code word (for the length is greater than 2 and smaller than 11, a RM code is adopted):

$$q_i^{ACK} = \sum_{n=0}^{O-1} (o_n^{ACK} \cdot M_{(i\bmod 32),n}) \bmod 2,$$

i=0, 1, 2, . . . , QACK-1

Wherein, $M_{i,n}$ represent the basic sequence of RM codes.
3. Repeat output bits. It is unnecessary to repeat the first code word (with the length of $Q^0_{ACK}$=40) and necessary to repeat the second code word once so as to obtain output bits corresponding to two layers, which can be realized with two methods (the length is $Q^1_{ACK}$*2=60):
a) Supposing that modulation method is QPSK, namely $Q_m$=2, then:

$$Q_{out}^{ACK} = q_0^{ACK} q_1^{ACK} q_0^{ACK} q_1^{ACK} q_2^{ACK} q_3^{ACK} q_2^{ACK} q_3^{ACK}$$

b) Repeat the whole sequence directly, then:

$$Q_{out}^{ACK} = q_0^{ACK} q_1^{ACK} q_2^{ACK} q_3^{ACK} \ldots$$
$$q_0^{ACK} q_1^{ACK} q_2^{ACK} q_3^{ACK}$$

4) Multiplex and interleave the output bits of two codes and the data of each code word.

Embodiment II (Corresponding to Scheme I and Method 2)

Supposing that there are O=15 bits of ACK/NACK source bits and/or RI source bits $o_n^{ACK}$, 3-layer PUSCH data transmission of M=2 code words in total (one layer for the first code word and two layers for the second code word), the sequence of coded output bits is $q_i^{ACK}$ (the length of output bits on each layer of two code words, $Q_{ACK}$ is 40 and 30 respectively), the processing steps are as follows:

1). Copy source bits to form two groups, with each group referring to $o_n^{ACK}$, used for ACK/NACK transmission and/or RI transmission on two code words respectively.
2). Perform channel coding on each code word (for the length is greater than 11, RM (32, O) code is adopted):

Wherein, after grouping the first code, RM (32, 8) code and RM (32, 7) code are adopted to code channel respectively for the two different groups, and after truncating, the length of output bits is $Q^O_{ACK}$=40.

After grouping the second code, RM (32, 8) code and RM (32, 7) code are adopted to code channel respectively for the two different groups (60, 15), and after truncating, the length of output bits is $Q^1_{ACK}$*2=60.
3) Multiplex and interleave the output bits of two codes and the data of each code word.

Embodiment III (Corresponding to Scheme II)

Supposing that there are O=10-bit of ACK/NACK source bits and/or RI source bits, $O_n^{ACK}$, L=3-layer PUSCH data transmission of M=2 code words in total (one layer for the first code word and two layers for the second code word), the sequence of coded output bits is $q_i^{ACK}$ (the length of 3-layer output bits $Q_{ACK}$ is 40, 30 and 30 for each layer respectively), the processing steps are as follows:

1) Copy source bits to form three groups, with each group referring to $O_n^{ACK}$, used for ACK/NACK transmission and/or RI transmission on three layers respectively.
2) Perform channel coding on each layer (for the length is greater than 3 and smaller than 11, a RM code is adopted):

$$q_i^{ACK} = \sum_{n=0}^{O-1} (o_n^{ACK} \cdot M_{(i\bmod 32),n}) \bmod 2,$$

i=0, 1, 2, . . . , QACK-1

The number of output bits of three layers after channel coding is $Q_{ACK,0}$=40, $Q_{ACK,1}$=30 and $Q_{ACK,2}$=30 respectively.
3) Multiplex and interleave the 3-layer output bits and the data of each layer.

The present invention can be applied widely, including to antennas and antenna array, any duplexing system (TTD system or FDD system) and any uplink transmission under sending mode (such as SU-MIMO, MU-MIMO and CoMP).

The present invention solves the problem of transmission and channel coding of ACK/NACK and/or RI in MIMO system and takes into account high load situations and backward compatibility.

The present invention has one or a plurality of the following beneficial technical effects:
(1) Simple processing and a small amount of calculation;
(2) Be capable of supporting high-information-bit load;
(3) Be capable of obtaining more coding gains.

What is mentioned above is only the preferred embodiments and will not restrict the present invention. For those skilled in the art, various modifications and changes can be shown in the present invention. Any modification, substitution, improvement, etc. within the spirit and principle of the present invention shall be included in the protective scope of the present invention.

The invention claimed is:

1. A method for processing uplink control information (UCI) based on a multiple input multiple output (MIMO) system, which comprises:
repeating Acknowledgement/Negative Acknowledgement (ACK/NACK) source bits and/or rank indicator (RI) source bits in the uplink control information to form M groups, with each group corresponding to a code word, wherein, M is the total number of code words;
performing channel coding on the ACK/NACK source bits and/or RI source bits corresponding to each code word to obtain $Q_{ACK}$*$L_i$ output bits, wherein, $Q_{ACK}$ is the number of channel coding output bits corresponding to each layer in a certain code word, L is the total number of layers, and the number of layer corresponding to the i$^{th}$ code word is $L_i$; and
multiplexing and interleaving the output bits and the data bits of the corresponding code word;
wherein, the channel coding mode is determined in accordance with the number of ACK/NACK source bits and/or RI source bits corresponding to each code word and the ACK/NACK source bits and/or RI source bits are coded with the determined coding modes,
wherein, if the number of the ACK/NACK source bits and/or RI source bits is smaller than A, such source bits are coded repeatedly after inserting one or more placeholders to obtain $Q_{ACK}$ output bits; and
if the number of the ACK/NACK source bits and/or RI source bits is greater than or equal to A, and smaller than or equal to B, a RM (32, O) code is adopted for channel coding; if QACK>32, the coded bits are cycled and repeated to obtain $Q_{ACK}$ output bits;
wherein, A<B, A and B are positive integers.

2. The method as claimed in claim 1, wherein the output bits are repeated in accordance with the number of layer $L_i$ mapped by current code word to obtain output bits corresponding to all layers in a code word.

3. The method as claimed in claim 2, wherein if data modulation mode in current code word is $Q_m$, the output bits are repeated by taking $Q_m$ bits as the unit; or, $Q_{ACK}$ output bits are directely repeated without reference to data modulation mode in the code word.

4. The method as claimed in claim 1, wherein if the number of the ACK/NACK source bits and/or RI source bits is greater than B, a convolutional code is adopted for coding channels to obtain $Q_{ACK}$ output bits.

5. A method for processing uplink control information (UCI) based on a multiple input multiple output (MIMO) system, which comprises:
  repeating Acknowledgement/Negative Acknowledgement (ACK/NACK) source bits and/or rank indicator (RI) source bits to form L groups with each group corresponding to a layer, wherein, L is the total number of layers;
  carrying out channel coding on the ACK/NACK source bits and/or RI source bits corresponding to each layer to obtain $Q_{ACK}$ output bits; and
  multiplexing and interleaving the output bits and the data bits of the corresponding layer;
  wherein, the channel coding mode is determined in accordance with the number of ACK/NACK source bits and/or RI source bits corresponding to each code and such source bits are coded with the determined coding modes,
  wherein if the number of the ACK/NACK source bits and/or RI source bits is smaller than A, such source bits are coded repeatedly after inserting one or more placeholders for source bits to obtain $Q_{ACK}$ output bits; and
  if the number of the ACK/NACK source bits and/or RI source bits is greater than or equal to A and smaller than or equal to B, a RM (32, O) code is adopted for coding channels, and if $Q_{ACK}>32$, the coded bits are cycled and repeated to obtain $Q_{ACK}$ output bits;
  wherein, A<B, A and B are positive integers.

6. The method as claimed in claim 5, wherein if the number of the ACK/NACK source bits and/or RI source bits is greater than B, a convolutional code is adopted for coding channels to obtain $Q_{ACK}$ output bits.

7. An apparatus for processing uplink control information (UCI) based on a multiple input multiple output (MIMO) system, comprising a memory and one or more processors, wherein:
  the memory is configured to store computer readable program codes, and the one or more processors execute the computer readable program codes to implement a baseband data processing unit, wherein the one or more processor further execute the computer readable program codes to implement:
  a repetition module, for repeating Acknowledgement/Negative Acknowledgement (ACK/NACK) source bits and/or rank inidcator (RI) source bits in the uplink control information to form M groups with each group corresponding to a code word, wherein, M is the total number of code words and is a positive integer;
  a channel coding module, for performing channel coding on the ACK/NACK source bits and/or RI source bits corresponding to each code word to obtain $Q_{ACK}*L_i$ output bits, wherein $Q_{ACK}$ is the number of channel coding output bits corresponding to each layer in a certain code word, L is the total number of layers, and the number of layer corresponding to the $i^{th}$ code word is $L_i$; and
  a processing module, for multiplexing and interleaving the output bits and the data bits of the corresponding code word;
  wherein the channel coding module comprises:
    a module for determining coding modes, for determining coding modes in accordance with the number of ACK/NACK source bits and/or RI source bits corresponding to each code word; and
    a coding module, for coding the ACK/NACK source bits and/or RI source bits with the determined coding modes,
  wherein if the number of the ACK/NACK source bits and/or RI source bits is smaller than A, such source bits are coded repeatedly after inserting one or more placeholders to obtain $Q_{ACK}$ output bits; and
  if the number of the ACK/NACK source bits and/or RI source bits is greater than or equal to A and smaller than or equal to B, a RM (32, O) code is adopted for channel coding, and if $Q_{ACK}>32$, the coded bits are cycled and repeated to obtain $Q_{ACK}$ output bits;
  wherein, A<B, A and B are positive integers.

8. The apparatus as claimed in claim 7, wherein the channel coding module repeats the output bits in accordance with the number of layer $L_i$ mapped by current code word to obtain output bits corresponding to all layers in the code word.

9. The apparatus as claimed in claim 8, wherein if data modulation mode in current code word is $Q_m$, the channel coding module repeats the output bits by taking $Q_m$ bits as the unit; or the $Q_{ACK}$ output bits are directly repeated without reference to data modulation mode in a code word.

10. The apparatus as claimed in claim 7, wherein if the number of the ACK/NACK source bits and/or RI source bits is greater than B, a convolutional code is adopted for coding channels to obtain $Q_{ACK}$ output bits.

* * * * *